United States Patent Office
3,787,348
Patented Jan. 22, 1974

3,787,348
N,N-DIMETHYLACETAMIDE SOLUTIONS OF POLYHYDRAZIDES
Frank Dobinson, Gulf Breeze, and Chris A. Pelezo, Pensacola, Fla., assignors to Monsanto Company, St. Louis, Mo.
No Drawing. Filed Sept. 20, 1972, Ser. No. 290,597
Int. Cl. C08g 51/44
U.S. Cl. 260—32.6 NA    11 Claims

ABSTRACT OF THE DISCLOSURE

Stable, N,N-dimethylacetamide/lithium chloride spinning solutions comprised of a high-molecular weight polymer consisting essentially of recurring structural units of which at least 90 mol percent are of the formula

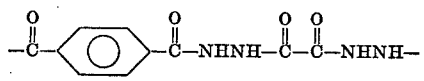

and 10 mol percent or less are of the structure

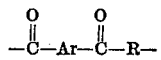

where R is

each Ar and Ar' is a divalent aromatic radical, the chain-extending covalent bonds of which are oriented meta or para to one another, and X is a covalent bond or a said divalent aromatic radical with the proviso that when Ar is a para-phenylene radical X is a said divalent aromatic radical. These solutions are useful for making shaped articles such as fibers and films having excellent tensile properties.

DESCRIPTION OF THE PRIOR ART

The polyhydrazide of oxalic dihydrazide and isophthaloyl chloride prepared by the conventional low-temperature solution polymerization process is illustrated in U.S. Pat. 3,130,183, as well as dimethyl sulfoxide spinning solutions thereof. The solutions are prepared by isolating the polyhydrazide from the polymerization reaction mixture, washing the isolated polyhydrazide and then dissolving it in dimethyl sulfoxide. The patent also suggests that polyhydrazides which are soluble in dimethyl sulfoxide may also be obtained by replacing up to 65 mol percent of the isophthaloyl chloride with terephthaloyl chloride. However, it is known from other prior art that, when more than about 65 mol percent of the isophthaloyl chloride is replaced with terephthaloyl chloride, the resulting polyhydrazide is not soluble in dimethyl sulfoxide; for example, J. Poly. Sci., Part A, vol. 2, 1147–1156 (1964). It is also known that polyhydrazides of this type have limited solubility in solvents commonly utilized in their preparation, i.e., in the conventional low-temperature polymerization process. As a result, heretofore, reaction mixtures resulting from the preparation of these polyhydrazides have not been directly utilized as spinning solutions.

The dimethyl sulfoxide solutions of U.S. 3,130,183 have several inherent disadvantages. One disadvantage in that their preparation requires an intermediate step, i.e. isolation of the polyhydrazide from the reaction mixture resulting from their preparation. Another disadvantage is that the ratio of para-phenylene to meta-phenylene radicals in the polyhydrazide structure cannot be greater than about 65:35 since at greater ratios the polyhydrazide will not dissolve in dimethyl sulfoxide. On the other hand, it is generally recognized that the tensile properties of fibers prepared from polyhydrazides of this type improve as the para-phenylene content thereof increases with optimum tensile properties being obtained when all the phenylene radicals of the polymer structure are para-oriented with respect to one another.

OBJECTS OF THE INVENTION

An object of the present invention is to provide stable N,N - dimethylacetamide/lithium chloride spinning solutions from which fibers are spun or films are cast comprised of high-molecular-weight polymers having recurring structural units of which at least 90 mol percent are of the formula

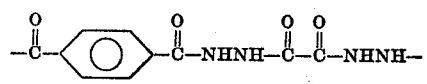

Another object of the invention is to provide a process for preparing said solutions which comprises merely polymerizing the appropriate polymer-forming reactants in N,N - dimethylacetamide containing dissolved lithium chloride.

Still another object of the invention is to provide shaped articles, such as filaments, from said solutions.

SUMMARY OF THE INVENTION

The present invention provides stable spinning solutions comprised of a polymer consisting essentially of recurring structural units of which at least 90 mol percent are of the formula (I)   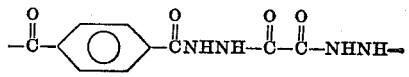

and 10 mol percent or less are of the formula (II)   

wherein R is a radical selected from the group consisting of

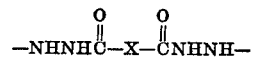

and

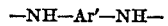

and mixtures thereof, each Ar and Ar' is a divalent aromatic radical, the chain-extending covalent bonds of which are oriented meta or para to one another and X is a covalent bond or a said divalent aromatic radical with the proviso that when Ar is a para-phenylene radical, X is a said divalent aromatic radical, dissolved in N,N-dimethylacetamide containing 1 to 12 percent by weight of lithium chloride, wherein said polymer has an inherent viscosity of at least 1.0, measured as hereinafter described, and fibers spun therefrom.

The spinning solutions of the present invention are easily prepared by merely polymerizing the appropriate reactants in N,N-dimethylacetamide containing lithium chloride and may be spun directly into fibers without isolation of the polymer in an intermediate step. Elimination of this intermediate step together with the low cost of N,N-dimethylacetamide (DMAc) makes the solution of the present invention of particular commercial significance. Fibers spun from the solutions of the present invention have excellent tensile properties.

The solutions of the present invention are prepared by modifying the conventional low-temperature solution polymerization process described in the prior art to provide for (1) high-speed stirring or shearing of the reaction mixture during polymerization, whereby a viscous polymer gel is formed; (2) addition of a small amount of water or organic hydroxylic compound, e.g., 1 to 4% by volume, to this gel and (3) further high-speed stirring or shearing of the gel until a clear polymer solution (i.e. dope) is obtained.

In the preparation of a typical solution of the present invention utilizing the modified low-temperature process described herein, oxalic dihydrazide is dissolved in N,N-dimethylacetamide containing 5% by weight lithium chloride (DMAc/5% LiCl) at 50° C. The solution is then cooled to room temperature (i.e., 25° C.) and a small amount of a chain terminator, such as benzhydrazide, is added thereto, if desired. Then, a substantially equimolar amount of terephthaloyl chloride, based on the amount of oxalic dihydrazide used, is added all at once. The mixture is maintained at room temperature while stirred at 600 r.p.m. Stirring is started immediately after addition of the terephthaloyl chloride and continued for 20 minutes. An opalescent, thick dope is formed to which a small amount of water containing lithium hydroxide is added, followed by further addition of water. Under continued stirring of this mixture at 600 r.p.m., a bright clear polymer solution is formed. Addition of water (1 to 3% by total volume) enables a clear solution to form. Lithium hydroxide or lithium carbonate is added in an amount sufficient to neutralize the HCl formed during polymerization.

Polymers useful in carrying out the present invention are preferably prepared by using, as reactants, a diacid chloride reactant consisting of terephthaloyl chloride or a mixture of terephthaloyl chloride and isophthaloyl chloride, wherein the mixture contains at least 90 mol percent terephthaloyl chloride and a reactant consisting of oxalic dihydrazide or a mixture consisting of (A) a dihydrazide of the formula

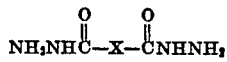

or an aromatic diamine of the formula NH$_2$—Ar'—NH$_2$ or mixtures thereof and (B) oxalic dihydrazide in which at least 90 mol percent of the mixture is oxalic dihydrazide.

Representative diamines of the general formula

NH$_2$—Ar'—NH$_2$, where Ar' has the same meaning as previously defined, may be represented by the formula

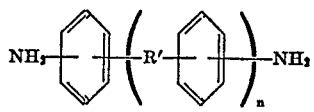

where n is 0 or 1 and R' is a covalent bond or a radical selected from the group consisting of

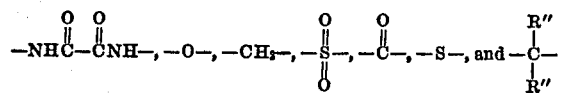

R'' being a C$_1$ to C$_4$ alkyl radical. Typical aromatic diamines of this type are:

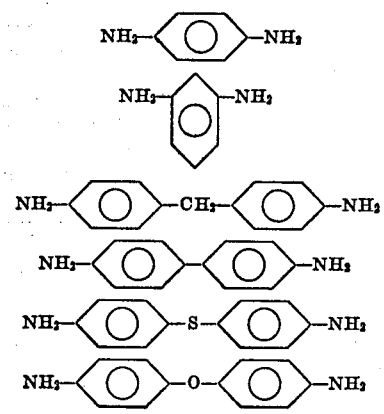

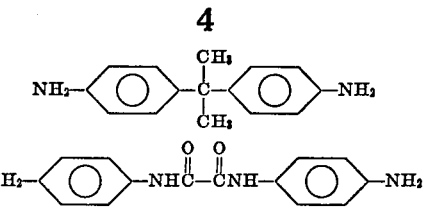

Representative dihydrazides of the formula

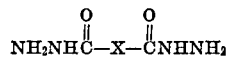

are oxalic dihydrazide and dihydrazides of the structure

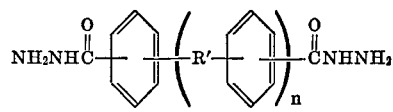

wherein X, R' and n have the same meaning as previously defined. Typical dihydrazides of the above structure are:

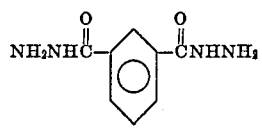

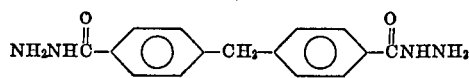

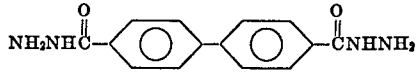

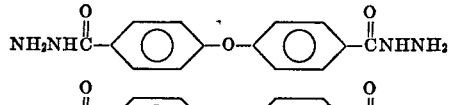

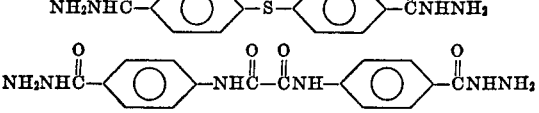

The dihydrazides can be prepared from the corresponding dicarboxylic acids by reacting the dialkyl esters of the acids with hydrazine.

In a preferred embodiment of the invention the polymer solution is obtained by reacting stoichiometric amounts, i.e., substantially equimolar amounts, of terephthaloyl chloride and oxalic dihydrazide in N,N-dimethylacetamide containing dissolved lithium chloride under the conditions described herein. However, it is contemplated that in the preparation of the solutions 10 mol percent or less of the oxalic dihydrazide may be replaced with terephthalic dihydrazide, isophthalic dihydrazide or one or more of the above-described aromatic diamines or dihydrazides, or mixtures thereof and/or 10 mol percent or less of the terephthaloyl chloride may be replaced with isophthaloyl chloride without departing from the scope of the invention.

It is essential to the preparation of the polyhydrazide solutions described herein that there is sufficient mixing of the reaction mixture, both during and after polymerization, to keep the polymer in solution. Naturally, the severity of the mixing required to attain the solutions will vary with conditions employed, e.g., temperature, polymer concentration, polymer structure, stirring time, etc. However, the severity of mixing may be easily determined by experimentation. Means other than stirring may be employed to achieve the required mixing of the reaction mixture during preparation of the solutions. It has generally been found that adequate mixing of the reaction mixture is attained by utilizing, as the stirring means, a helical stirrer attached to a high-torque, high-speed motor capable of producing 400–700 r.p.m.

In view of the teachings in the prior art, it is indeed surprising to discover that useful N,N-dimethylacetamide spinning solutions of the polymers described herein can be attained.

The invention is further illustrated by the following examples, but is not limited thereto.

In the following examples, inherent viscosities ($\eta_{inh}$) has been determined in accordance with the following equation:

$$\eta_{inh} = \frac{\ln(\eta_{rel})}{C}$$

wherein $\eta_{rel}$ represents the relative viscosity, C represents a concentration of 0.5 grams of the polymer in 100 ml. of the solvent. The relative viscosity ($\eta_{rel}$) is determined by dividing the flow time in a capillary viscometer of a dilute solution of the polymer by the flow time for the pure solvents; flow times are measured at 25° C.

EXAMPLE 1

This example illustrates the preparation of a DMAc spinning solution of the polyhydrazide consisting of 90 mol percent of recurring units of the structure

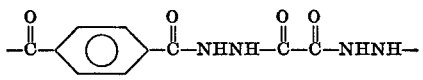

and 10 mol percent of recurring units of the structure

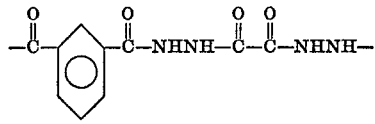

and fibers shaped therefrom.

Oxalic dihydrazide (0.01 M) was dissolved in 50 ml. of dry DMAc containing 5% dissolved LiCl in a glass vessel fitted with a downward driven helical stirrer attached to a high-torque, high speed motor. The solution was cooled to 0° C. by means of an ice bath and stirred at about 400 r.p.m. Then terephthaloyl chloride (0.009 M) and isophthaloyl chloride (0.001 M) was added. The reaction mixture became opalescent, at which time, 5 ml. of water was added. Continued rapid stirring produced a clear, viscous dope.

The viscous dope was placed in a hollow, stainless-steel spinning vessel. Fibers were spun through a 5-hole, 6-ml. spinneret. The filaments were spun through a half-inch air gap into an aqueous spin-bath. Clear, well-collapsed filaments were wound up on a pair of godet rolls immersed in a wash-bath of DMAc/water (25% DMAc), at such a rate that the filaments were relaxed (net stretch, 0.7 times). The washed fibers then passed through a 2-foot bath of 10% DMAc in water, heated to 90° C., and over a second pair of godet rolls to give a cascade stretch of about 1.3 times. The fibers were further washed on this second pair of rolls by water at 50° C. The resulting fibers were tough and possessed excellent tensile properties.

COMPARATIVE EXAMPLE 1

The procedure used in Example 1 to prepare the polymer solution (dope) was repeated except that, in this instance, instead of utilizing the high-speed stirring means of Example 1, the reaction mixture was stirred at 100 r.p.m. with a Teflon stirrer attached to a small motor by means of a glass rod. A clear polymer was formed initially, but within less than an hour it suddenly formed a hard transparent mass that did not soften or melt when heated between glass plates up to a temperature of 280° C.

EXAMPLE 2

This example illustrates the preparation of a DMAc/LiCl spinning solution of the polyhydrazide consisting of 90 mol percent of recurring units of the structure

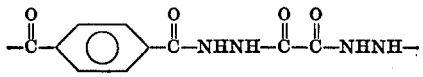

and 10 mol percent of recurring units of the structure

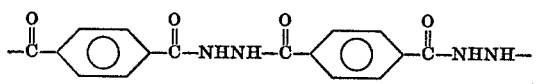

and fibers shaped therefrom.

Oxalic dihydrazide (0.009 M) and terephthalic dihydrazide (0.001 M) were dissolved in 50 ml. of dry DMAc/5% LiCl in a glass vessel identical to that described in Example 1. The solution was cooled to 0° C. and stirred at 400 r.p.m. Terephthaloyl chloride (0.01 M) was added. The reaction mixture became opalescent, at which time, 5 ml. of water was added. Continued rapid stirring produced a clear, viscous dope from which fibers can be spun using the procedure followed in Example 1.

COMPARATIVE EXAMPLE 2

The procedure used to prepare the polymer solution of Example 2 was repeated with the exception that the stirring means of comparative Example 1 was used and operated at 100 r.p.m. instead of the high-speed stirring means of Example 2. A clear viscous dope was formed, but it quickly gelled to a hard solid that could not be spun into fibers.

EXAMPLE 3

This example illustrates the preparation of a DMAc solution of the polyhydrazide consisting of recurring units of the structure

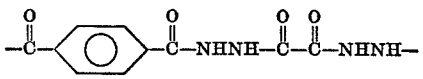

and fibers prepared therefrom.

Oxalic dihydrazide (0.1 M) was dissolved in 400 ml. of dry DMAc/5% LiCl in a 2-liter glass vessel fitted with a downwardly driven helical stirrer attached to a high-torque, high-speed motor. The solution was cooled to 25° C. by means of a water-bath and stirred at 400 r.p.m. Then, terepthaloyl chloride (0.1 M) was added and washed in with 80 ml. of DMAc/5% LiCl. The reaction solution first cleared as it became more viscous. Then, as build-up of the viscosity continued, the reaction solution began to haze and became opalescent (at about 10 minutes from the start of the reaction). At this time, 10 ml. of water was added. Continued high-speed stirring produced a clear solution. The $\eta_{inh}$ of the polymer was determined from a portion of the solution and found to be 1.35. The remainder of the solution was spun into tough fiber using the technique described in Example 1.

COMPARATIVE EXAMPLE 3

The procedure used in Example 3 to prepare the polymer solution was repeated except that the stirring means of comparative Example 1 was used and operated at 100 r.p.m. instead of the high-speed stirring means of Example 3. The polymer rapidly precipitated and could not be spun into fibers.

The tensile properties (e.g. tenacity and modulus) of the fibers can be substantially increased by conventional techniques, for example, by further stretching, annealing and/or other secondary heat-treatments of the fibers and/or by modification of the spinning conditions recited in the examples.

We claim:

1. Film- and fiber-forming solution comprising a polymer consisting essentially of recurring structural units of which at least 90 mol percent are of the formula

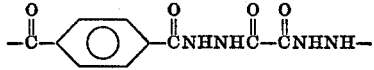

and 10 mol percent or less are of the formula

wherein R is a radical selected from the group consisting of

and

—NH—Ar'—NH— and mixtures thereof, each Ar and Ar' is a divalent aromatic radical, the chain extending covalent bonds of which are oriented meta or para to one another, and X is a covalent bond or a said divalent aromatic radical with the proviso that when Ar is a para-phenylene radical X is a said divalent aromatic radical, dissolved in N,N-dimethylacetamide containing dissolved lithium chloride in an amount of from about 1 to 10 weight percent.

2. The solution of claim 1, wherein the polymer has an inherent viscosity of at least 1.0, when measured in N,N-dimethylacetamide containing 5% lithium chloride on a weight basis, as solvent, at a concentration of 0.5 gram of polymer per 100 ml. of said solvent.

3. The solution of claim 1, wherein Ar is meta-phenylene and R is

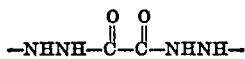

4. The solution of claim 1, wherein Ar is selected from the group consisting of meta-phenylene, para-phenylene and mixtures thereof and R is

5. The solution of claim 4, wherein Ar is meta-phenylene.

6. The solution of claim 4, wherein Ar is para-phenylene.

7. A filament of a polymer consisting essentially of recurring structural units of which at least 90 mol percent are of the formula

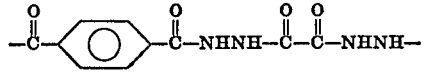

and 10 mol percent or less are of the formula

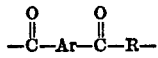

wherein R is a radical selected from the group consisting of

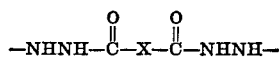

and

—NH—Ar'—NH— and mixtures thereof, each Ar and Ar' is a divalent aromatic radical, the chain extending covalent bonds of which are oriented meta or para with respect to one another, and X is a covalent bond or a said divalent aromatic radical with the proviso that when Ar is a para-phenylene radical X is a said divalent aromatic radical.

8. The filament of claim 7, wherein Ar is meta-phenylene, R is

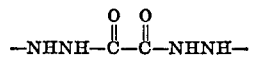

9. The filament of claim 7, wherein Ar is selected from the group consisting of meta-phenylene, para-phenylene and mixtures thereof and R is

10. The solution of claim 1, wherein said polymer consists essentially of recurring structural units of the formula

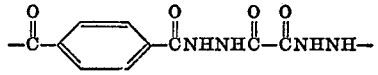

11. The filament of claim 7, wherein said polymer consists essentially of recurring structural units of the formula

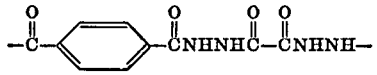

References Cited

UNITED STATES PATENTS

| | | | |
|---|---|---|---|
| 3,130,183 | 4/1964 | Frazer | 260—78 R |
| 3,130,182 | 4/1964 | Frazer | 260—78 R |
| 3,642,707 | 2/1972 | Frazer | 260—78 TF |
| 3,644,297 | 2/1972 | Sekigucki | 260—78 R |

MORRIS LIEBMAN, Primary Examiner

R. ZAITLEN, Assistant Examiner

U.S. Cl. X.R.

260—326 NT, 78 TF